United States Patent Office 2,835,481
Patented May 20, 1958

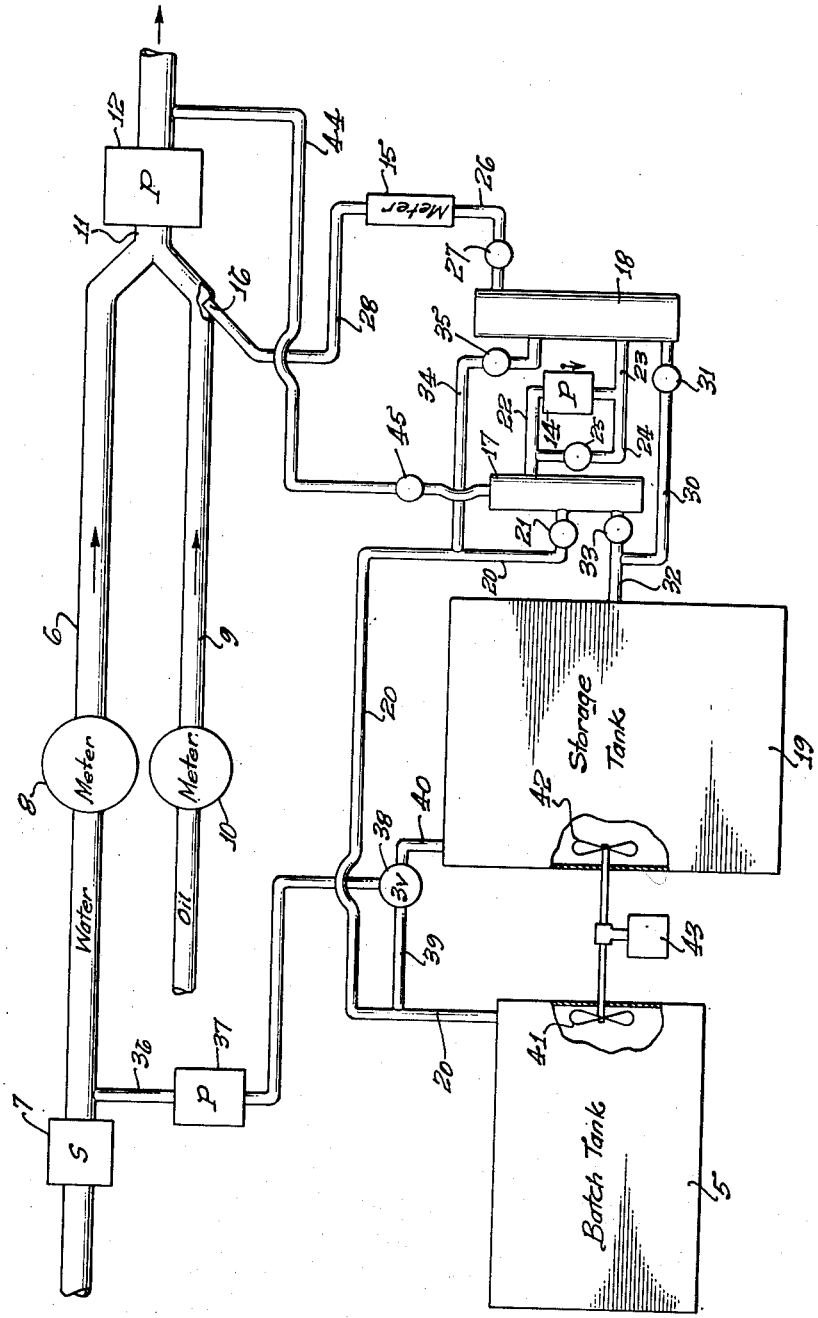

2,835,481

METHOD AND APPARATUS FOR MIXING AND METERING AN UNSTABLE SUSPENSION OF A SOLID IN A LIQUID

Willis T. Cox, Santa Ana, Calif.

Application December 13, 1955, Serial No. 552,745

2 Claims. (Cl. 259—1)

This invention relates to apparatus and a method for mixing and metering various liquids, to be subsequently simultaneously used in combination, and more particularly relates to the case where one of the mixed liquids is an unstable suspension, of a solid in a liquid and therefore liable to separation into its constituent parts. The invention has been specifically applied to mixtures of pulverized weed killers, available as dry powders, with water and oils as carrying and spreading agents, and will be hereinafter described in terms of that application, but is not limited thereto as its usefulness in numerous other applications will be obvious.

In large-scale weed-killing operations, as for example along railroads or highways, it is common practice to spray the marginal right-of-way with oil, or with a mixture of oil and water. If a weed-killing chemical is used in addition to the oil, larger proportions of water may be used, with economy, and the general efficiency may be heightened. If the chemical killer selected is a liquid readily entering into the water-oil combination, there will seldom be any difficulty in keeping it in suspension or solution and passing it through the pipes, pumps, and spraying nozzles of the spraying apparatus. But some of the more effective and economical weed-killers are manufactured as dry powders, which however are not applied as such but are intended to be mixed with water which activates them, spreads them, and causes them to penetrate the soil on which they are spread. Unfortunately some of the otherwise most efficient and economical of these powders separate from the carrying water into a sludge which hardens when given an opportunity to settle out, and which can easily clog pumps and spray-nozzles.

It is not only necessary to keep such powders (and water) in agitated motion in order to prevent separation and sludging; it is also necessary, for the greatest economy in operation, to meter them accurately in proportion to the amount of water used. If the powders are placed in the ultimate amount of water used, they may dissolve and disperse irregularly therein, and an accurate measure of their concentration is very difficult to obtain. If on the other hand they are dispersed in a strong concentration, to facilitate measurement, the problem of maintaining uniformity in the highly separable slurry and passing the mixture through a suitable metering orifice with a steady flow, presents other and equal problems.

It is an object of this invention to provide a method and suitable apparatus for mixing a powder-water suspension of measurable concentration, maintaining the suspension in an adequately agitated condition while conveying the suspension to its ultimate point of mixture, and subjecting it to a high pressure whereby it may be forced by injection into the liquids with which it is ultimately mixed.

Another object of this invention is to provide a method and apparatus in which the high pressure is applied to the suspension prior to metering the suspension, so that the suspension may be forced at a substantially contant flow through a suitable metering orifice.

Still another object of the invention is to provide for division of the flow of the suspension between the point of application of high pressure and the meter, whereby a storage tank may be filled while a batch of the suspension is being mixed in a mixing tank, and to provide a reversal of the flow of the suspension from the storage tank to a zone of low pressure, whereby the contents of the storage tank may be used and continuous operation of the system maintained, this being important to the efficiency of the metering system.

In the accompanying drawing, the figure is a diagrammatic plan view of the apparatus embodying my invention.

Having reference to the drawing, and in terms of mixing a quantity of some pulverized weed-killer with a carrying liquid which in turn is to be diluted and combined with a second liquid, I have shown a mixing or batch tank 5, in which a weed-killing powder (for example the powder sold under the trade-name of Telvar) may be mixed in carefully measured quantities with a known quantity of water to form a slurry. The end-result in this operation may be to mix a metered quantity of this slurry with similarly metered amounts of oil and of water, and to pump the resultant mixture through spray nozzles upon ground to be cleared of weeds. I have therefore shown a water-pipe 6, passing through a strainer 7 to obtain comparative purity, and through a meter 8, and then joining an oil-pipe 9, also having a meter 10. The pipe 11, in which the pipes 6 and 9 join, feeds a pump 12, and thence goes to the spraying nozzles, not shown.

The difficulty hitherto encountered, as aforesaid, has been to maintain the slurry unseparated, and to get it into the pipe 11 in a metered quantity. Opening any of the pipes 6, 9, or 11 to the atmosphere in a mixing tank greatly increases the difficulty of accurate metering, if indeed it does not destroy the possibility of it. Yet it has been commonly believed that a heavy slurry could not otherwise be diluted and mixed, because it could not successfully be sucked into a pipe when the other contents of the pipe had greater liquidity. I have provided that the slurry should pass successively through a pump 14 and a meter 15, being forced under pressure through the meter, and then pass into the pipe 6—9—11 system through an injection nozzle 16 while still under the pressure of the pump 14. As shown, the injection nozzle 16 is in the oil pipe 9, as when an oil emulsion is to be formed it is preferable to form it gradually with the carrying water of the slurry before diluting it with the clear water, but the injection nozzle may enter the system anywhere on the suction side of the pump 12.

In bringing the slurry to the pump 14 and thence to the injection nozzle 16, I prefer to pass the slurry through a low pressure or suction manifold 17 and then continuously through a high pressure manifold 18 at a rate greater than the desired rate of metering, as the system permits the use of a storage tank 19 which gives continuous service while another batch of slurry is being prepared in the tank 5. The tank 5 is connected to the low pressure manifold 17 by a pipe 20 through a valve 21. The low pressure manifold 17 is connected to the high pressure manifold 18 through pipes 22 and 23 leading to and from the pump 14, a by-pass being also provided by a pipe 24, closable by a valve 25. The high pressure manifold 18 is connected to the meter 15 by a pipe 26, valved at 27, and another pipe 28 leads to the injection nozzle 16. The hitherto described piping system constitutes the normal conduit for slurry from the tank 5 to the injection nozzle 16 when the storage tank 19 is not being used.

However, to utilize the storage tank 19 for continuous operations, I provide a return pipe 30 from the high pressure manifolds 18, with a valve at 31. The pipe 30 leads to a pipe 32 connecting the low-pressure manifold 17 with the tank 19 and including a valve 33. It will be apparent that by fully opening the valve 21 between the batch tank 5 and the low pressure manifold 17, and by partly opening the valves 27 and 31 and closing the valve 33, the flow from the high pressure manifold may be divided in any selected quantities between the meter 15 and the storage tank 19. Thus while the batch tank 5 is emptying, the storage tank 19 may be partly filled. Then when the batch tank 5 is empty and is being filled with a new batch of slurry, the tank 19 may be drawn upon by closing the valves 21 and 31 and opening the valve 33.

The low pressure or suction manifold 17 will be seen to have four pipes entering it, namely 44, 20, 32, and 22, each pipe except pipe 22 being valve-controlled. In operation there is suction in pipe 22; the pipes 44, 20, and 32 afford selective sources of materials. The importance of the suction manifold lies in the fact that it permits a continuous circulation through the high pressure manifold 18 and meter 15 of materials selected from any of these sources, while at the same time a part of these materials are separated from the metered part and, by-passing the suction manifold so as not to disturb its selective function, are placed in storage tank 19 for later use.

Thus the above-described apparatus, although it may be modified in details, provides means for establishing the necessary high pressure zone by means of which, according to my method, the original concentrated slurry may be forced, as desired either through a meter and an injection nozzle into a diluent liquid or into temporary storage from which it may be withdrawn.

It may sometimes be desired to return the contents of the tank 19 to the tank 5, for instance, at the end of an operation. For this purpose a pipe 34, closable by a valve 35, leads from the high pressure manifold 18 to a connection with the pipe 20. With the valves 33 and 35 open, and the valves 21 and 31 closed, the contents of the tank 19 will be passed through the low pressure manifold 17, the pump 14, the high pressure manifold 18 and back to the batch tank 5.

For filling the batch tank 5 with water, a pipe 36 leads from the main water pipe 6 through a pump 37 and may advantageously run to a 3-way valve 38. From the valve 38 one branch pipe 39 may connect with the pipe 20 to bring water to the tank 5—it could, of course, connect directly into the tank 5—and another branch pipe 40 may connect with the tank 19. As both the tank 5 and the tank 19 are fitted with agitator paddles 41 and 42, shown as running from one motor 43, such a system enables both tanks to be used if desired as batch-forming tanks and also permits them to be flushed out.

The paddle 42 also maintains the desired suspension of the slurry in the tank 19, which in direct operations from the tank 5 is maintained by the manifold system and the pump 14 so that the meter 15 will not only receive it and pass it, but will accurately record it, and the injection nozzle 16 will inject it.

Occasionally flushing out the manifold system, pump 14, and meter 15 is desirable without disturbing or diluting a batch in either of the tanks 5 or 19. A pipe 44, for this purpose, may lead from the pipe 11, temporarily fed only by the water pipe 6, having its connection thereto beyond the pump 12 so as to receive water under pressure and being led through a valve 45 into the low pressure manifold 17.

It will be seen that the above-described apparatus of tanks, pumps, meters, and piping, not only enables me to carry out my method of increasing the pressure on the unstable suspension or slurry and then metering it and injecting it into the diluting fluids, but has numerous other advantageous characteristics. However, as some of these are purely accessory to the main objects of the invention and may be modified in many ways, I do not claim them, but claim only the broad principles of my method and that part of my apparatus suited to carry my method into effect.

I claim:

1. The method of mixing and metering a liquid and a pulverized material in a proportion sufficient to make the resultant suspension unstable, which comprises: mixing a batch of said liquid and pulverized material to form said suspension, continuously transferring said suspension to a closed zone of low pressure and thence to a closed zone of high pressure at a rate greater than the desired rate of metering, utilizing said high pressure to force a desired portion of said suspension through a meter, utilizing said high pressure to force the remaining portion of said suspension directly into a storage tank distinct from said zone of low pressure, said remaining portion by-passing said zone of low pressure, and then reversing the flow of said remaining portion from said storage tank so as to cause said suspension to flow into said zone of low pressure and then into said zone of high pressure and to become available for metering while a succeeding batch of said suspension is being mixed.

2. Apparatus for mixing and metering two liquids, one of which contains pulverized solid material in an unstable suspension, which comprises: a batch mixing tank for mixing said one liquid and said solid material; a first manifold, and valved pipe means connecting said batch mixing tank and said first manifold; a second manifold; means including a pump connecting said first manifold to said second manifold; a pipe line, including a meter, for said other liquid; pipe means connecting said second manifold to said pipe line at a position beyond said meter, said pipe means including a second meter and an injection nozzle, for injecting a metered quantity of said one liquid into said pipe line; a second tank; and valved pipe means connecting both of said manifolds to said second tank whereby said second tank may selectively be placed in communication with either of said manifolds.

References Cited in the file of this patent

UNITED STATES PATENTS

| | | |
|---|---|---|
| 956,065 | Fleming | Apr. 26, 1910 |
| 1,722,433 | Kirschbraun | July 30, 1929 |
| 2,650,168 | Van Dijk et al. | Aug. 25, 1953 |
| 2,698,303 | Blair et al. | Dec. 28, 1954 |